(12) United States Patent
Nawashiro

(10) Patent No.: US 7,438,452 B2
(45) Date of Patent: Oct. 21, 2008

(54) ILLUMINATION DEVICE

(75) Inventor: Mitsuhiro Nawashiro, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 11/359,777

(22) Filed: Feb. 23, 2006

(65) Prior Publication Data

US 2006/0187659 A1 Aug. 24, 2006

(30) Foreign Application Priority Data

Feb. 24, 2005 (JP) ............................. 2005-049517

(51) Int. Cl.
*B60Q 1/26* (2006.01)
(52) U.S. Cl. .................................... 362/490
(58) Field of Classification Search ......... 362/487–488, 362/490; 200/310–317
See application file for complete search history.

(56) References Cited

U.S. PATENT DOCUMENTS 4,937,408 A * 6/1990 Hattori et al. ............... 200/314

6,013,956 A * 1/2000 Anderson, Jr. ............. 307/10.1
6,024,463 A * 2/2000 Ishikawa et al. ............. 362/621
7,021,810 B2 * 4/2006 Hoffman .................... 362/577
2006/0021861 A1 * 2/2006 Schmidt et al. ............. 200/5 R

FOREIGN PATENT DOCUMENTS

JP 2002-127821 5/2002

* cited by examiner

*Primary Examiner*—Jong-Suk (James) Lee
*Assistant Examiner*—Julie A. Shallenberger
(74) *Attorney, Agent, or Firm*—Prosz Law Group, PLC

(57) ABSTRACT

An illumination device includes a first light source. The first light source is fixed on an interior ceiling located between a driver seat and a passenger seat in a vehicle. The first light source illuminates an interior compartment of the vehicle. The illumination device also includes a second light source that illuminates around the driver or the passenger. The illumination device further includes a switch that electrically controls the second light source. The switch includes a peripheral part that is located adjacent to the first light source, and the peripheral part emits light from the first light source. The illumination device indicates a location of the switch in dark conditions in the interior compartment of the vehicle in a visually pleasing manner. The illumination device has a simple structure and is simple to install.

3 Claims, 2 Drawing Sheets

ILLUMINATION DEVICE

CROSS REFERENCE TO RELATED APPLICATION

This application is based on and incorporates by reference Japanese Patent Application No. 2005-49517, which was filed on Feb. 24, 2005.

BACKGROUND OF THE INVENTION

The present invention relates generally to an interior illumination device and specifically to an interior illumination device that is fixed on a vehicle ceiling.

A map lamp is used for viewing a map in a dark interior compartment. The map lamp illuminates an area around a passenger.

Since a map lamp is used when it is dark, it is difficult to recognize where the map lamp is. Even though some light come into the interior compartment from outside, the light does not reach the map lamp easily because the map lamp is located on the vehicle ceiling. Thus, it is difficult to find the position of the map lamp. Therefore, a prior art map lamp includes a switch that includes a light source. The switch is indicated by the light source in the dark compartment. However, it is difficult to place a light source specialized for indicating a switch in the limited space. If the map lamp and the light source are housed in the limited space, installation is complex and relatively expensive.

SUMMARY OF THE INVENTION

An object of the invention is to overcome the above-mentioned limitations. An illumination device according to the present invention indicates the location of a switch for a map lamp in the dark of an interior compartment of a vehicle in a visually pleasing manner. The illumination device also has a simple structure, and installation is relatively simple.

Basically, the invention is an illumination device for an interior compartment of a vehicle. The illumination device includes a first light source. The first light source is fixed on an interior ceiling located between a driver seat and a passenger seat in a vehicle. Light from the first light source illuminates an interior compartment of the vehicle. The illumination device also includes a second light source that illuminates around the driver seat or the passenger seat. The illumination device further includes a switch that electrically controls the second light source. The switch includes an emitting part that is located adjacent to the first light source, and the emitting part emits light from the first light source.

BRIEF DESCRIPTION OF THE DRAWINGS

The accompanying figures, in which like reference numerals refer to identical or functionally similar elements throughout the separate views and which, together with the detailed description below, are incorporated in and form part of the specification, serve to further illustrate various embodiments and to explain various principles and advantages all in accordance with the present invention.

DETAILED DESCRIPTION OF THE PREFERRED EMBODIMENTS

Figure 1:
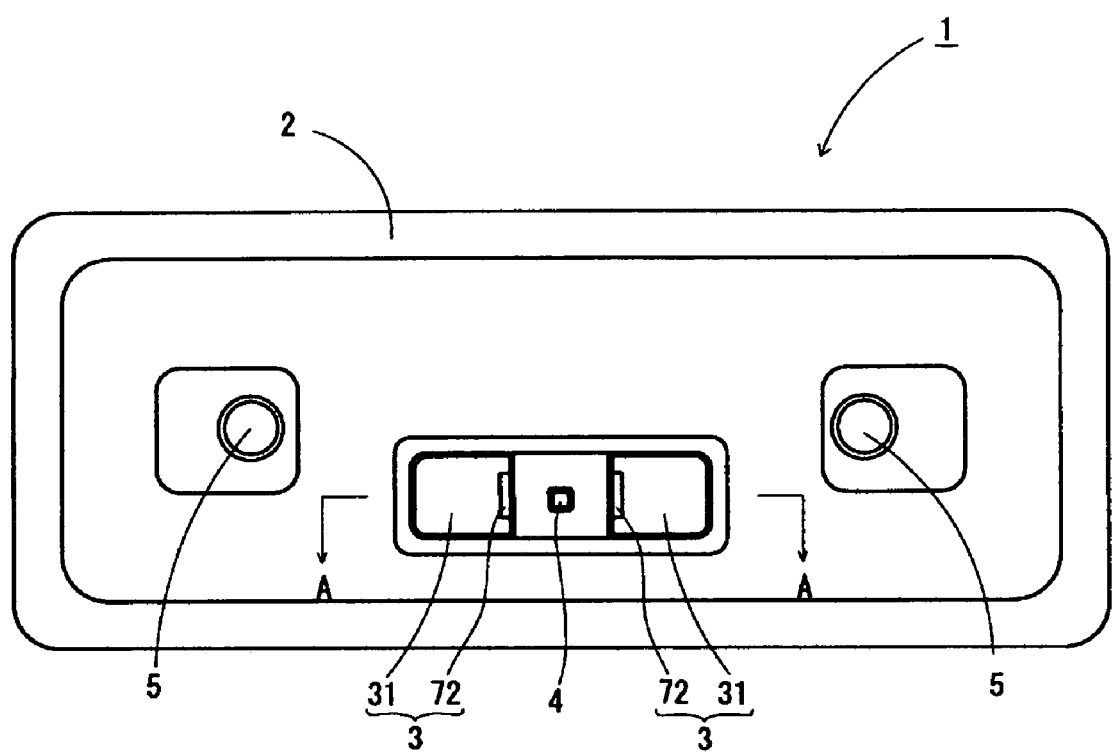
FIG. 1 is a front view of an illumination device for interior illumination of a vehicle.

Referring to FIG. 1, an illumination device 1 is fixed on an interior ceiling of a vehicle and is located between a driver seat and a passenger seat on the interior ceiling. The illumination device has a symmetrical structure and includes a pair of switches 3, a light aperture 4, a first light source 6, and a pair of map lamps (a second light source) 5 in a casing 2. The first light source 6 is located at the approximate center of the illumination device. The first light source 6 illuminates an interior compartment of the vehicle. Specifically, the first light source 6 illuminates around a center console and a shift lever.

The first light source 6 includes a light emitting diode (LED), which is a lamp type LED and emits white light, and a substrate 61, which supports the LED. Because the LED is a very small light source, the LED can be placed in a small space. Also, the LED needs little electricity to work, so electric power consumption is low. Other types of LEDs can be used, such as a surface mounted diode type LED or a chip on board type LED. A plurality of LEDs can be used as either of the first light source 6 and the second light source 5. The color of the LED is not limited to white. Any color of LED can be used for either of the light sources. Further, the first light source 6 is not limited an LED. Any type of bulb can be used.

A cover 42, which defines the light aperture 4 and controls light from the first light source 6, is fixed on the casing 2. The light aperture 4 extends along a light axis 62 of the first light source 6. A colored filter 41 is fixed to the cover 42 in the light aperture 4. The colored filter 41 is made from a transparent plastic, which is colored in amber and which changes white light from the LED to amber light. The white light can also be changed to an arbitrary color by a color layer, such as a transparent ink, a transparent colored tape, or a transparent colored film located on the colored filter 41. When the color layer includes inorganic phosphor, such as YAG:Ce, or organic phosphor, the color layer can be used to a blue LED as the first light source 6. When the color layer is located on the light axis 62 of a blue LED, only illumination that is emitted in the direction of the light axis 62 is changed to a predetermined color.

Each of the map lamps 5 emits light from the second light source 5 around one passenger (including the driver) in the vehicle. Each map lamp 5 works as a spot light and helps the passenger to read in the dark, for example.

Figure 2:
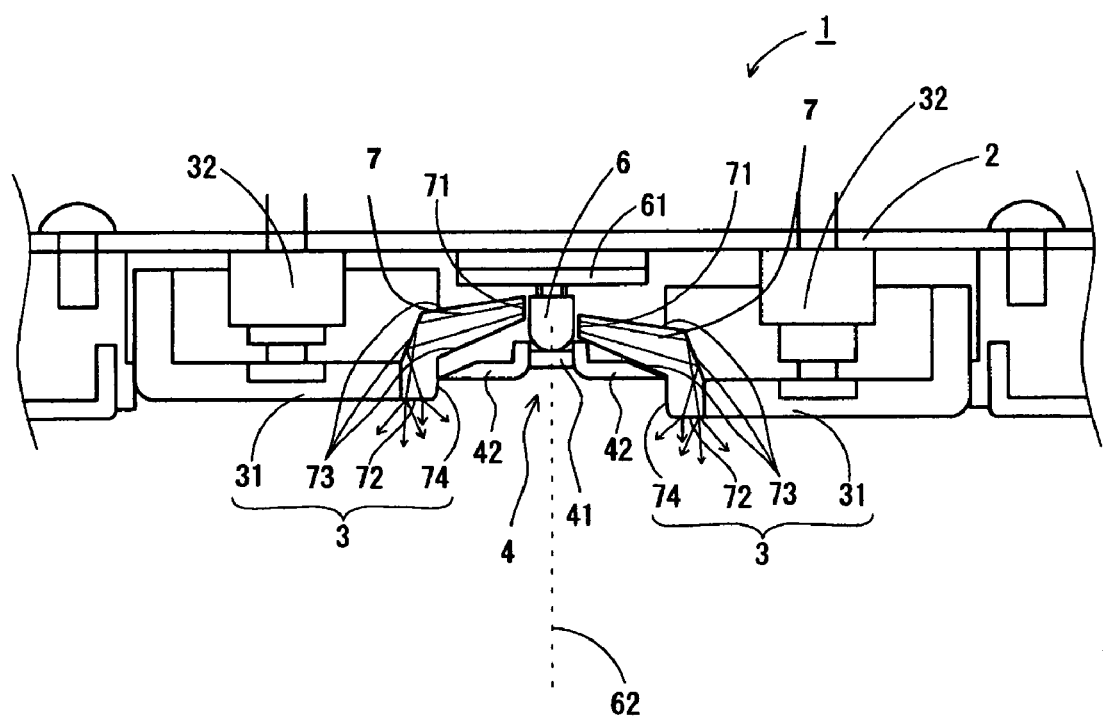
FIG. 2 is a cross sectional view at line A-A of FIG. 1.

The switches 3 are located at both sides of the first light source 6. Each of the switches 3 corresponds to one of the driver seat and the passenger seat. Since the switches are identical, only one will be described. A side of the switch 3 adjacent to the first light source 6 is formed by a light guide 7, which is made from colorless acrylic resin material. The light guide 7 can also be made from other synthetic resin, such as polyethylene terephthalate (PET), polycarbonate resin, silicon resin and epoxy resin, or other inorganic material, such as glass. As shown in FIG. 2, the light guide 7 is generally L-shaped in cross section.

A light receiving face 71 of the light guide 7 receives some light from the first light source 6. The light receiving face 71 is located at an inner end of the light guide 7, which is adjacent to the first light source 6. The light receiving face 71 is preferably located to face a side of the first light source 6. Thus, the light receiving face 71 efficiently receives a laterally directed part of the light from the first light source 6. The laterally directed light is emitted in a direction that is perpendicular to the light axis 62 of the LED.

A light emitting face 72 is formed at an outer end of the light guide 7. The light emitting face 72 emits the light that is received at the light receiving face 71 from the first light source 6. The light emitting face 72 of the light guide 7 faces the passenger. The light emitting face 72 is coplanar or coextensive with an outer surface of the switch 3 as shown in FIG. 2. The light emitting face 72 indicates the location of the switch 3 and gives a luxurious appearance. The color of the light emitted from the light emitting face 72 is the same as the color of the light from the first light source 6. When the outer surface of the switch 3 is curved, the light emitting face 72 can be curved to match the curved switch 3.

Because the light emitting face 72 is preferably formed along one peripheral edge of the switch 3 that is adjacent to the first light source 6, the visibility of the switch 3 in the dark is improved.

A surface of the light emitting face 72 is finished with a light diffusing treatment. The light diffusing treatment may be a blast finishing, matt painting or another well known finishing process. The light diffusing treatment diffuses the light emitted at the light emitting face 72. Thus, the light from the light emitting face 72 is uniform and the light emitting face 72 has matt luminescence that provides a luxurious appearance. When the diffusing treatment is not performed on the light emitting face 72, the light emitting face 72 looks clear.

The light guide 7 can include a light diffusing agent therein. The light diffusing agent diffuses the light from the LED in the light guide 7. As a result, uniform light is emitted at the light emitting face 72. The light diffusing agent may include small particles, such as glass, metal, or resin that have a different reflection index from the light guide 7, or silica.

The light guide 7 can be made from colored transparent material that includes a color agent. Also, if a color layer is used, the color layer can be formed at the light receiving face 71 or the light emitting face 72 of the light guide 7. Then, colored light, which is different in color from the white light of the first light source 6, is emitted from the light emitting face 72.

The light guide 7 can includes a phosphor. Any kind of phosphors can be used if the phosphor generates a predetermined color luminescence when the phosphor receives light from a light source. If the light guide 7 includes YAG:Ce phosphors therein and the first light source 6 is a blue LED, a part of the light from the blue LED is changed to a yellow color by the YAG:Ce phosphors, and blue light and yellow light are mixed to generate white light. Then the illumination around the center console will be blue, and the indication color of the light emitting face 72 will be white.

A side face 74, which is adjacent to the light emitting face 72, is masked by an opaque resin to avoid leakage of light from the side of the light guide 7. When light from the first light source 6 proceeds inside the walls of the light guide 7 at a predetermined angle, the light is repeatedly reflected at the inside walls, because the refractive index of the light guide 7 is higher than that of air. The inside walls of the light guide 7, except for the light receiving face 71 and the light emitting face 72, are reflecting faces 73. Thus, the reflecting faces 73 reflect light in the light guide 7. Therefore, the light guide 7 transmits light from the light receiving face 71 to the light emitting face 72 via reflecting faces 73.

The switch 3, except for the light guide 7, is made from an opaque resin material. The switch 3 includes a switch mechanism 32 at backside thereof. The switch mechanism 32 is a push button mechanism that is electrically connected with the associated map lamp 5. Thus, the switch 3 turns on the associated map lamp 5. On the other hand, the first light source 6 is turned on according to the state of a remote switch (not shown). The remote switch may serve other purposes such as controlling exterior lights, for example. In FIG. 2, the left-sided switch 3 is in an on position, and the right-sided switch 3 is in an off position. A switch mechanism 32 is not limited to the illustrated push button mechanism. A slide mechanism or other well-known mechanism can be used for the switch 3.

The illuminating operation of the illumination device 1 will be explained. The first light source 6 is turned on corresponding to the remote switch. An axial part of the light from the first light source 6, which is emitted in the direction of the axis 62, is changed to an amber color by the colored filter 41. The cover 42 limits the illumination area of the axial part of the light from the first light source 6 for illuminating around a shift lever.

Laterally directed light from the first light source 6, which is emitted in a substantially lateral direction with the light axis 62, is emitted into the light receiving face 71. The light received at the light receiving face 71 is introduced into the light guide 7. The received light is repeatedly reflected in the light guide 7 by the reflecting faces 73, and proceeds to the light emitting face 72. Then, the light is emitted from the light emitting face 72. Because the light emitting face 72 is finished with a diffusing treatment, the emitted light is well diffused at the light emitting face 72. Thus, an outer part (the light emitting face 72) of the switch 3, which is adjacent to the first light source 6, has in a well-equalized white illumination.

As mentioned above, when the exterior marker light is turned on by the remote switch in the dark, the illumination device 1 illuminates around the shift lever and simultaneously emits white light at the light emitting face 72. Thus, the visibility of the switch 3 is improved in the dark. Because the switch 3 includes the light emitting face 72, the light emitting face 72 moves in accordance with the motion of the switch 3. Because the light emitting face 72 is located near the first light source 6, the light path from the light receiving face 71 to the light emitting face 72 is short in the light guide 7. Thus, loss of the light in the light guide 7 is reduced. Because only the light emitting face 72 of the switch 3 emits light for indicating the location of the map lamp, the light emitting face 72 does not conflict with other illuminations. Therefore, the illumination is well balanced, and the light emitting face 72 can indicate the location of the switch 3 while providing a luxurious appearance.

The switch 3 is indicated by light from the first light source 6. Thus, an additional light source is not needed to indicate the switch 6, and additional space for such an additional light source is not needed. Therefore, the illumination device 1 is compact. The first light source 6 is used for illuminating around the shift lever and for indicating the location of the map lamp. Thus, the number of parts for the illumination device 1 is reduced, and the structure is simple. Therefore, the cost of manufacturing the illumination device 1 is relatively low.

In the illustrated embodiment, a side face 74 of the light guide 7 is exposed and therefore must be masked to prevent light from escaping. However, the light emitting face 72 can be located entirely within the opaque material 31 of the switch 3. In this case, the side face 74 is not exposed and would not require masking.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. An illumination device, comprising:
   a first light source, which is adapted to be fixed on an interior ceiling located between a driver seat and a passenger seat in a vehicle for directly illuminating an interior compartment of the vehicle;
   a second light source, which includes two lights that are adapted to be located corresponding to the driver seat or the passenger seat and to illuminate around the driver seat or the passenger seat; and
   two switches, each of which is located at a side of the first light source such that each of the switches is laterally adjacent to the first light source and each of the switches electrically controls one of the lights, wherein each of the switches includes a light emitting part that is laterally adjacent to the first light source, and wherein the light emitting part of the switch emits light from the first light source, wherein
   the light emitting part of the switch is formed from a light guide,
   the light guide includes a light receiving face and a light emitting face,
   the light receiving face of the light guide faces the first light source at a first end of the light guide and receives laterally directed light from the first light source,
   the light emitting face of the light guide is formed at a second end of the light guide and emits the laterally directed light from the first light source,
   each of the switches is entirely laterally spaced from an axial light path of the first light source such that the axial light path of the first light source is not blocked by either of the switches, and
   the light from the first light source that directly illuminates the interior compartment of the vehicle is emitted axially from the first light source, and the laterally directed light from the first light source is emitted in a direction that is generally perpendicular to the axially emitted light.

2. An illumination device, comprising:
   a first light source, which is fixed on an interior ceiling and is located between a drive seat and a passenger seat in a vehicle, wherein light from the first light source directly illuminates an interior compartment of the vehicle;
   a second light source, wherein light from the second light source illuminates around the driver seat or the passenger seat; and
   a switch, which electrically controls the second light source, wherein a light emitting part of the switch, which is laterally adjacent to the first light source, emits light from the first light source, wherein
   the light emitting part of the switch is formed from a light guide, and wherein the light guide includes a light receiving face and a light emitting face, wherein the light receiving face of the light guide faces the first light source at a first end of the light guide and receives laterally directed light from the first light source, and the light emitting face of the light guide is formed at a second end of the light guide and emits the laterally directed light from the first light source,
   the switch is entirely laterally spaced from an axial light path of the first light source such that the axial light path of the first light source is not blocked by the switch, and
   the light from the first light source that directly illuminates the interior compartment of the vehicle is emitted axially from the first light source, and the laterally directed light from the first light source is emitted in a direction that is generally perpendicular to the axially emitted light.

3. An illumination device, comprising:
   a casing;
   a first light source, which is fixed in the casing, wherein an axial part of the first light from the first light source is used for direct illumination of an area outside of the illumination device;
   a second light source, which is fixed in the casing, wherein the second light serves as a spot light; and
   a switch, which electrically controls the second light source, is laterally adjacent to the first light source, wherein the switch includes a light emitting face that emits light that is laterally directed from the first light source, wherein
   the light emitting part of the switch is formed from a light guide,
   the light guide includes a light receiving face and a light emitting face, wherein the light receiving face of the light guide faces the first light source at a first end of the light guide and receives laterally directed light from the first light source,
   the light emitting face of the light guide is formed at a second end of the light guide and emits the laterally directed light from the first light source,
   the switch is entirely laterally spaced from an axial light path of the first light source such that the axial light path of the first light source is not blocked by the switch, and
   the light from the first light source that directly illuminates the area outside of the illumination device is emitted axially from the first light source, and the laterally directed light from the first light source is emitted in a direction that is generally perpendicular to the axially emitted light.

* * * * *